United States Patent
Munninghoff et al.

(10) Patent No.: US 6,600,625 B1
(45) Date of Patent: Jul. 29, 2003

(54) DISK DRIVE WITH FLUID DEFLECTOR FOR REDUCING FLUID TURBULENCE NEAR TRANSDUCER ASSEMBLY

(75) Inventors: James Munninghoff, Sunnyvale, CA (US); Joseph Castagna, San Jose, CA (US); Steven Viskochil, Los Gatos, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/004,598

(22) Filed: Nov. 1, 2001

(51) Int. Cl.⁷ .............................................. G11B 17/02
(52) U.S. Cl. .................................................. 360/97.02
(58) Field of Search ........................... 360/97.01–97.03

(56) References Cited

U.S. PATENT DOCUMENTS 5,293,282 A * 3/1994 Squires et al. ........... 360/97.03
5,796,557 A * 8/1998 Bagnell et al. .......... 360/97.03
5,898,545 A * 4/1999 Schirle .................... 360/97.02
6,449,119 B1 * 9/2002 Hashizume et al. ..... 360/97.03
6,496,327 B2 * 12/2002 Xia et al. ................ 360/97.03

OTHER PUBLICATIONS

U.S. patent application Ser. No. 10/000,685, Harrison et al., filed Sep. 26, 2002.
U.S. patent application Ser. No. 10/022,260, Tokuyama et al., filed Jun. 20, 2002.

* cited by examiner

Primary Examiner—Robert S. Tupper
(74) Attorney, Agent, or Firm—James P. Broder; Steven G. Roeder

(57) ABSTRACT

A disk drive includes a storage disk, a head stack assembly and a fluid deflector. The head stack assembly includes a transducer assembly. The fluid deflector includes a deflector finger that deflects turbulent fluid flow away from the transducer assembly. The fluid deflector can include one or more landing pads that inhibit the slider from landing on the storage disk. The deflector finger can include a side that remains in close proximity to the slider during operation of the disk drive.

75 Claims, 7 Drawing Sheets

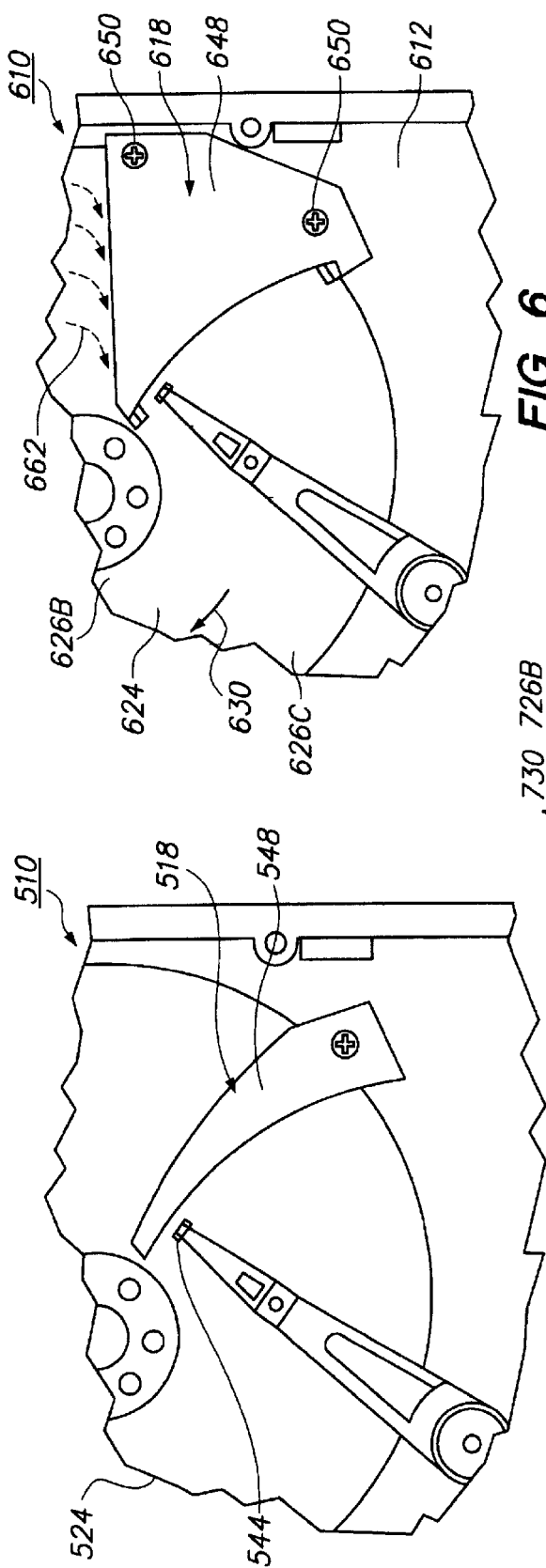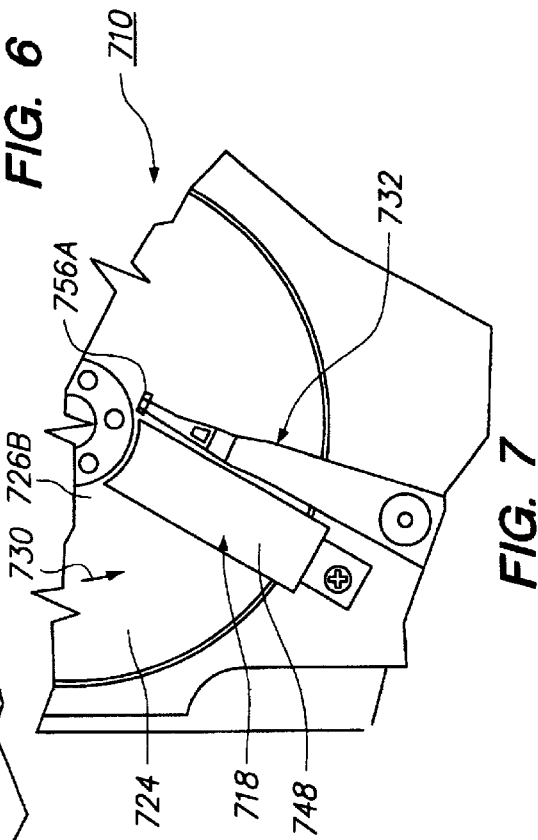
FIG. 6
FIG. 7
FIG. 5

DISK DRIVE WITH FLUID DEFLECTOR FOR REDUCING FLUID TURBULENCE NEAR TRANSDUCER ASSEMBLY

FIELD OF THE INVENTION

The present invention relates generally to disk drives for storing data. More specifically, the present invention relates to a fluid deflector that reduces air turbulence near a transducer assembly, reduces track misregistration and inhibits damage to data on a storage disk of the disk drive.

BACKGROUND

Disk drives are widely used in computers and data processing systems for storing information in digital form. These disk drives commonly use one or more rotating storage disks to store data. Each storage disk typically includes a data storage surface on each side of the storage disk. These storage surfaces are divided into a plurality of narrow, annular regions of different radii, commonly referred to as "tracks". Typically, a positioner is used to move an E-block and a transducer assembly having a data transducer over each data storage surface of each storage disk. The data transducer transfers information to and from the storage disk when positioned over the appropriate track of the storage surface.

The need for increased storage capacity and compact construction of the disk drive has led to the use of storage disks having increased track density or decreased track pitch, i.e., more tracks per inch. As the tracks per inch increase, the ability to maintain the data transducer over a target track becomes more difficult. More specifically, as track density increases, it is necessary to reduce the positioning error of the data transducer proportionally. With these systems, the accurate and stable positioning of the data transducer is critical to the accurate transfer and/or retrieval of information from the storage disk.

Moreover, the need for decreasing data transfer times has led to ever-increasing rotation speeds of the storage disks. However, as the storage disks rotate, air or other fluids in the spaces between adjacent storage disks is dragged along with the rotating disks and is accelerated outwardly toward the perimeter of the storage disks by centrifugal forces. The accelerated air is propelled from the spaces between the storage disks, resulting in low-pressure regions between adjacent storage disks. Air rushing in because of the pressure differential then fills the low-pressure regions. This repeated cycle causes chaotic and random flutter of the storage disks and turbulent air flow between the storage disks. The turbulent air flow can cause the E-block and the transducer assemblies to vibrate and become excited. The vibration makes it more difficult to position and maintain the data transducer over the target track. The turbulent air flow becomes even more significant as the storage disks rotate more rapidly and are positioned increasingly closer together. Thus, the ability to avoid track misregistration is becoming more difficult.

Attempts to reduce track misregistration caused by air turbulence include positioning an air dam or a comb at various locations in the drive housing. A typical air dam attempts to block the majority of the flow of air to the E-block and the transducer assemblies. Alternately, a comb attempts to smooth the flow of air to the E-block and the transducer assemblies. Unfortunately, existing air dams and combs can create differential pressure regions that result in increased turbulent air flow near the transducer assemblies and the E-block.

Another problem for disk drives is that data recorded onto the storage disks, as well as the transducer assemblies themselves, are susceptible to damage caused during startup or shutdown of the disk drive. Typically, the data transducer is secured to a slider having an air bearing surface. Once disk rotation ceases, the slider can "land" on the surface of the storage disk, resulting in loss of data and/or failure of the disk drive. In some disk drives, the positioner positions each slider over a landing zone on the storage disk as the disk drive powers down. This inhibits the slider from resting on an area of useful data storage during non-rotation of the storage disk.

Alternatively, other disk drives include either an OD ramp positioned near an outer diameter of the storage disk or an ID ramp positioned near an inner diameter of the storage disk. The positioner moves the transducer assemblies radially outward so that each transducer assembly slides onto the OD ramp or radially inward so that each transducer assembly slides onto the ID ramp. In either position, each slider is "unloaded" from the storage disk. Unfortunately, the ramps occupy valuable space in the disk drive and increase the cost of the disk drive.

In light of the above, the need exists to provide a reliable, simple, and efficient device that effectively decreases turbulent fluid flow near the transducer assemblies. Another need exists to provide a disk drive with reduced track misregistration. Still another need exists to provide a device that protects the storage disks and the transducer assemblies during shut down and startup of the disk drive. Yet another need exists to provide a disk drive that is relatively easy and cost effective to manufacture.

SUMMARY

The present invention is directed to a disk drive that includes a transducer assembly, a rotating storage disk and a fluid deflector. The transducer assembly includes a slider. The fluid deflector includes a deflector finger that extends along the storage disk near the transducer assembly. The deflector finger redirects fluid flow away from the transducer assembly and reduces the fluid turbulence experienced by the transducer assembly. This decreases lateral vibration of the transducer assembly, inhibits excitation of the transducer assembly, and decreases the incidence and extent of track misregistration.

In one embodiment, the fluid deflector includes a first landing pad that is positioned near the storage disk. The first landing pad can be positioned near an inner diameter or an outer diameter of the storage disk. During shutdown of the disk drive, the transducer assembly is moved to engage the first landing pad to maintain the slider away from the storage disk. This reduces the likelihood of contact between the slider and the storage disk. Incorporating the landing pad into the fluid deflector saves space in the disk drive and reduces the manufacturing cost. In another embodiment, the fluid deflector can include the first landing pad positioned near the inner diameter and a second landing pad positioned near the outer diameter of the storage disk.

In still another embodiment, the deflector finger includes a side that remains substantially equidistant from the slider during movement of the slider relative to the deflector finger along the storage disk. With this design, the transducer assembly is subjected to a consistent, substantially uniform aerodynamic environment regardless of the position of the slider along the storage disk. In this embodiment, the deflector finger can be positioned in close proximity to the slider and on an upstream side of the slider. Stated another way, the deflector finger is positioned near the transducer assembly, between the transducer assembly and the flow of the fluid generated during rotation of the storage disk. In this manner, the deflector finger effectively reduces fluid turbulence and smoothes the fluid flow near the transducer assembly.

The present invention also includes a method for enhancing the reliability of a disk drive. The method includes the steps of deflecting fluid flow with a fluid deflector away from the transducer assembly.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5 is a simplified, top plan view of the disk drive including still another embodiment of a fluid deflector having features of the present invention;

FIG. 6 is a simplified, top plan view of the disk drive including yet another embodiment of a fluid deflector having features of the present invention; and FIG. 7 is a simplified, top plan view of a portion of the disk drive including another embodiment of a fluid deflector having features of the present invention.

DESCRIPTION

Figure 1A:
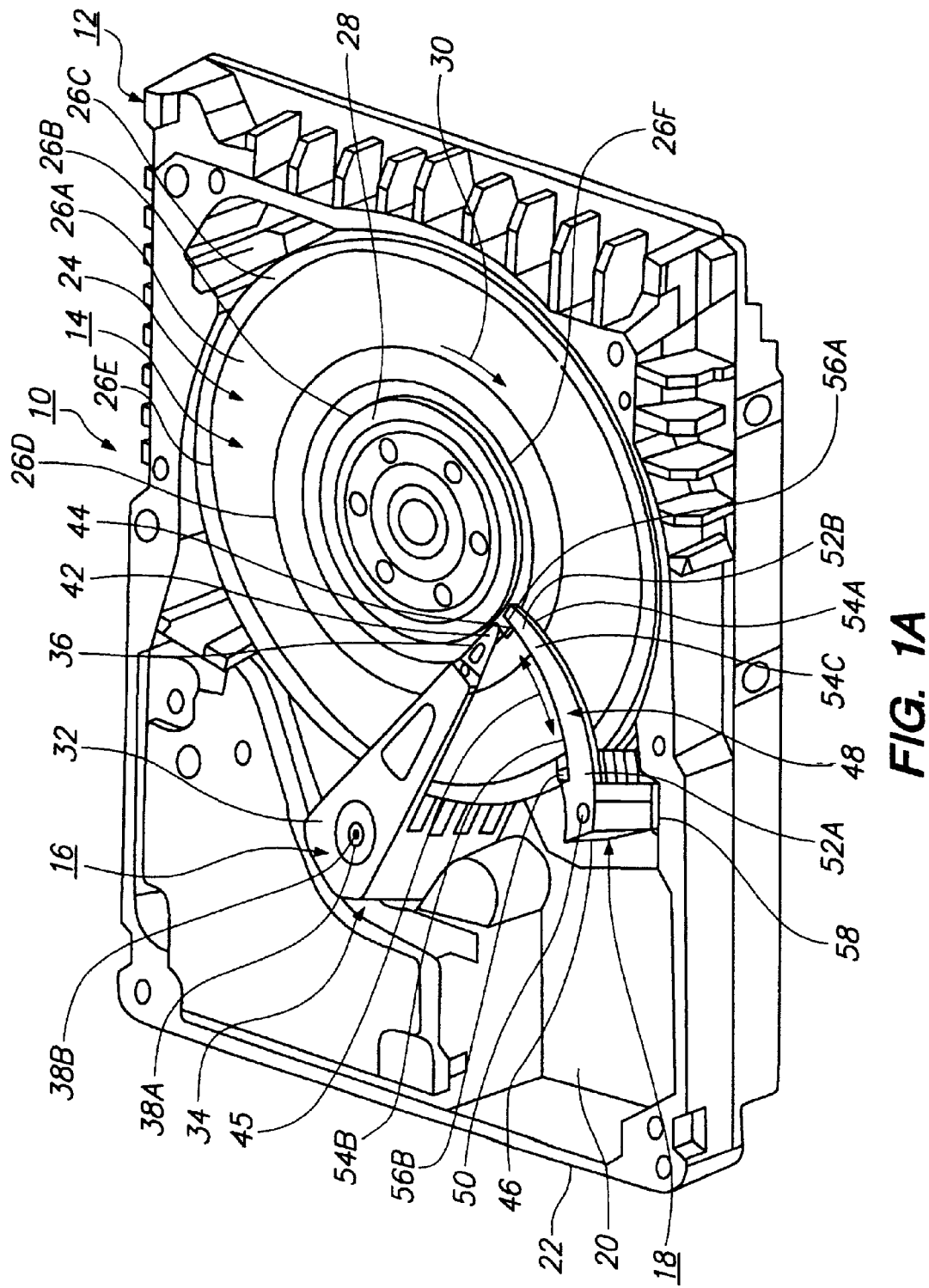
FIG. 1A is a simplified, perspective view of a disk drive including a fluid deflector having features of the present invention.

Referring initially to FIG. 1A, a disk drive 10 according to the present invention includes (i) a drive housing 12, (ii) a disk assembly 14, (iii) a head stack assembly 16, and (iv) a fluid deflector 18. The drive housing 12 retains the various components of the disk drive 10. The drive housing 12 includes a base 20 and four (4) side walls 22. The drive housing 12 also includes a cover (not shown) that is spaced apart from the base 20 by the side walls 22.

The disk assembly 14 includes one or more spaced apart, magnetic storage disks 24. Each storage disk 24 includes one or two storage surfaces 26A, an inner diameter 26B and an outer diameter 26C. Each storage surface 26A includes a plurality of annular shaped concentric data tracks 26D of different radii, including an outer data track 26E and an inner data track 26F. The number of storage disks 24 in the disk assembly 14 can be varied to suit the storage requirements of the disk drive 10.

The storage disks 24 are mounted on a disk spindle 28 with a bearing assembly (not shown). A spindle motor (not shown) rotates the disk spindle 28 and the storage disks 24 at a predetermined angular velocity. Rotation of the storage disks 24 generates turbulent fluid flow within the drive housing 12. The storage disks 24 can be rotated in a clockwise rotational direction (represented directional arrow) 30 or a counterclockwise rotational direction, as viewed from above the disk drive 10 of FIG. 1A.

The head stack assembly 16 includes an E-block 32, a positioner 34, and one or more transducer assemblies 36. The design of these components can be varied to suit the design requirements of the disk drive 10. In FIG. 1A, the E-block 32 is mounted to an actuator shaft 38A with a bearing assembly (not shown). The bearing assembly allows the E-block 32 to be rotated relative to the storage disks 24 about a block axis 38B.

The positioner 34 precisely moves the E-block 32 and the transducer assemblies 36 relative to the storage disks 24. In FIG. 1A, the positioner 34 is a voice coil motor that rotates the E-block 32 and moves the transducer assemblies 36 over the storage disks 24.

Each transducer assembly 36 includes a load beam 42, a flexure (not shown), and a slider 44 having a data transducer (not shown). The load beam 42 attaches the flexure and the slider 44 to the E-block 32. The load beam 42 is secured at or near the distal end of the E-block 32 and cantilevers towards the storage disk 24. The load beam 42 is flexible in a direction perpendicular to the storage disk 24 and acts as a spring for supporting the slider 44.

The slider 44 includes one or more fluid bearing surfaces. With this design, rotation of the storage disk 24 causes the slider 44 to fly at a predetermined flying height away from the storage disk 24. The flying height of the slider 44 is controlled by many factors, including the rotation speed of the storage disks 24, the design of the fluid bearing surfaces and the design of the load beam 42. As discussed below, the fluid deflector 18 is not believed to significantly influence the flying height.

The positioner 34 moves the data transducer and the slider 44 along an arc shaped transducer path 45 relative to the storage disk 24. The transducer path 45 has a radius that is approximately equal to the distance between the data transducer and the E-block axis 38B.

As used herein, the term "downstream side" refers to an area on the storage disks 24 that is just moving away from the transducer path 45 and the slider 44. The term "upstream side" refers to an area of the storage disks 24 that is closely approaching the transducer path 40 and the slider 44.

The fluid deflector 18 diverts and deflects turbulent fluid flow away from the transducer assemblies 36 and reduces turbulent fluid flow near the transducer assemblies 36. In the embodiment illustrated in FIG. 1A, the fluid deflector 18 includes a deflector body 46 and one or more deflector fingers 48.

The deflector body 46 maintains the deflector fingers 48 near the storage disks 24. In FIG. 1A, the deflector body 46 is positioned generally perpendicular to the storage surfaces 26A of the storage disks 24 and adjacent to the outer diameter 26C of the storage disks 24. The deflector body 46 is secured to the base 20 with a fastener 50. However, other positions and orientations of the deflector body 46 can be utilized. For example, the deflector body 46 can be secured to one or more of the side walls 22. The fluid deflector 18 can be mounted to the drive housing 12 after the disk assembly 14 has been mounted to the drive housing 12 and before or after the head stack assembly 16 has been mounted to the drive housing 12.

The deflector fingers 48 are positioned in close proximity to the transducer assemblies 36, and on the upstream side of the transducer assemblies 36. With this configuration, fluid flow generated by rotation of the storage disks 24 impacts the deflector fingers 48 and is diverted away from the transducer assemblies 36. As a result thereof, the deflector fingers 48 reduce fluid turbulence directly in front of the transducer assemblies 36. The number of deflector fingers 48 can vary depending upon the number of storage disks 24 and the number of transducer assemblies 20.

The design and shape of each deflector finger 48 can vary depending upon the requirements of the disk drive 10. Each deflector finger 48 includes a proximal end 52A that is secured to the deflector body 46, a distal end 52B positioned away from the deflector body 46, a leading side 54A, a trailing side 54B, a top side 54C and a bottom side 54D (not shown in FIG. 1A). The leading side 54A and the trailing side 54B are positioned so that any particular point on the rotating storage disk 24 will first pass adjacent to the leading side 54A and then adjacent to the trailing side 54B of the deflector finger 48. Further, the trailing side 54B is positioned closer to the slider 44 of the than the leading side 54A.

In FIG. 1A, the deflector fingers 48 extend and cantilever from the deflector body 46 over the storage surfaces 26A of the storage disks 24 from near the outer diameter 26C to near the inner diameter 26B of the storage disks 24. Alternately, for example, the deflector fingers 48 can extend only partially toward the inner diameter 50 of the storage disks 24.

Additionally, each deflector finger 48 can include a first landing pad 56A and a second landing pad 56B. The landing pads 56A, 56B provide a safe landing area for the sliders 44 during non-rotation of the storage disks 24. This inhibits damage to the transducer assemblies 36 and the storage disks 24 caused by contact between the sliders 44 and the storage disks 24.

The location of the landing pads 56A, 56B can be varied. For example, in FIG. 1A, the first landing pad 56A is positioned near the inner diameter 26B of the storage disk 24 and the second landing pad 56B is positioned near the outer diameter 26C of the storage disk 24. During shut-down of the disk drive 10, the positioner 34 rotates the E-block 32 and moves each transducer assembly 36 radially inward or radially outward to engage one of the landing pads 56A, 56B so that the sliders 44 do not land on the storage disks 24 when rotation ceases. FIG. 1A illustrates the transducer assembly 36 parked on the first landing pad 56A.

By incorporating the one or more landing pads 56A, 56B into the fluid deflector 18, two important functions are accomplished with one device. This saves space in the drive housing 12 and reduces manufacturing and assembly costs.

In this embodiment, the transducer assembly 36 can include a lifting feature (not shown) that engages the landing pads 56A, 56B. The lifting feature can cantilever from the transducer assembly 36 and slide onto one of the landing pads 56A, 56B during shutdown of the disk drive 10. The lifting feature inhibits contact between the transducer assembly 36 and the landing pads 56A, 56B from causing damage to the transducer assembly 36.

Additionally, the disk drive 10 can include a fluid filter 58 for filtering dust and particles from the fluid that is circulating in the drive housing 12. In this embodiment, the fluid filter 58 is positioned near the fluid deflector 18 and the outer diameter 26C of the storage disks 24. With this design, the fluid deflector 18 directs a portion of the fluid through the fluid filter 58. The fluid filter 58 illustrated in FIG. 1A is positioned against one of the side walls 22. However, the fluid filter 58 could be secured to the fluid deflector 18 and/or extend between the fluid deflector 18 and the drive housing 12.

Figure 1B:
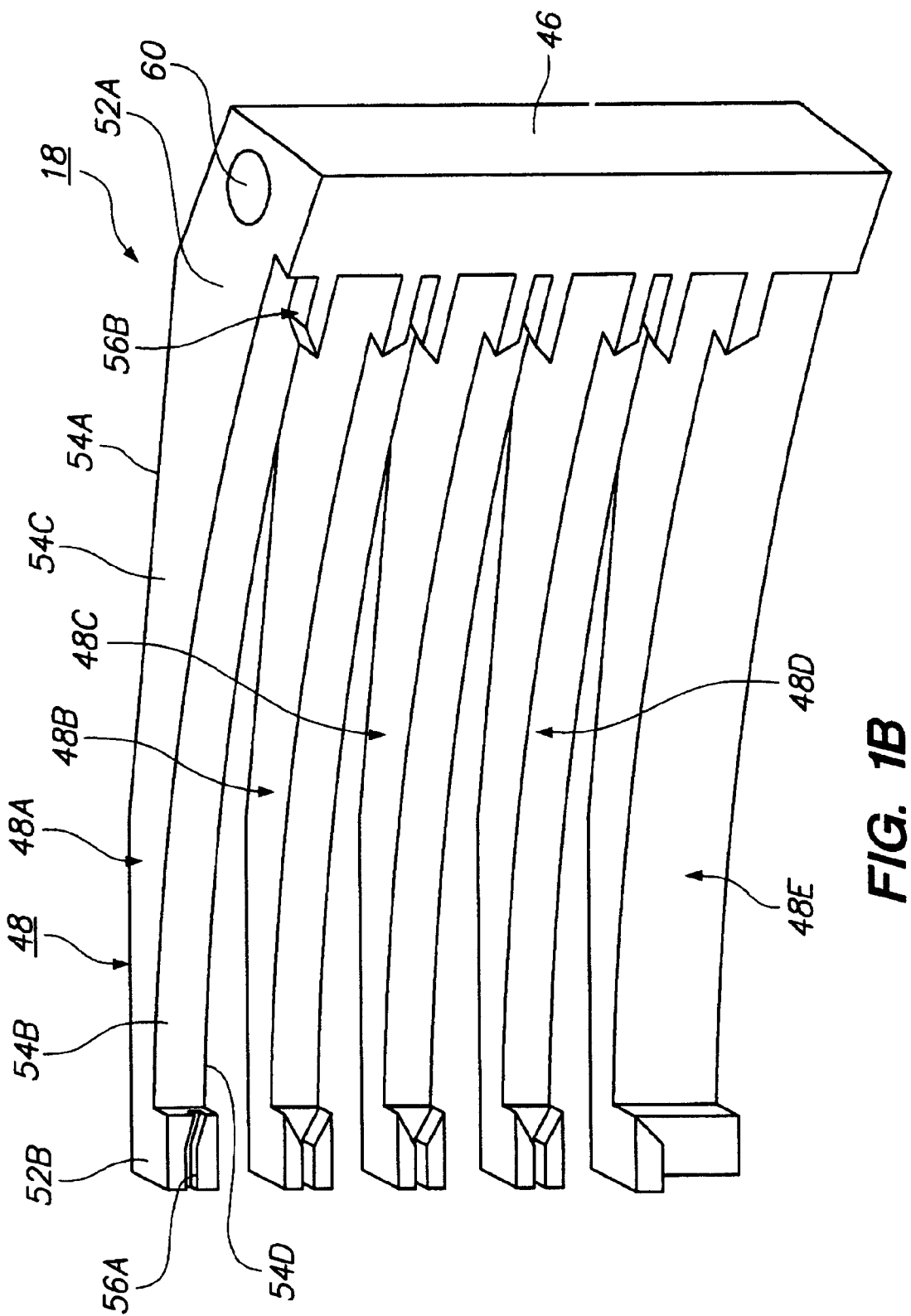
FIG. 1B is a perspective view of the fluid deflector of FIG. 1A.

FIG. 1B illustrates a perspective view of the fluid deflector 18 of FIG. 1A. The deflector body 46 is somewhat rectangular shaped and includes a fastener aperture 60 that extends through the deflector body 46 for securing the deflector body 46 to the drive housing 12 (not shown in FIG. 1B). In an illustrative embodiment, adaptable to a disk drive, the fluid deflector 18 includes five, spaced apart, substantially parallel deflector fingers 48 that cantilever away from the deflector body 46. In FIG. 1B, the deflector fingers 48 are referred to as a first deflector finger 48A, a second deflector finger 48B, a third deflector finger 48C, a fourth deflector finger 48D and a fifth deflector finger 48E moving top to bottom.

In this embodiment, the cross-sectional shape of each deflector finger 48 is generally rectangular shaped. Further, the trailing side 54B and the top side 54C are each generally flat. However, the trailing side 54B is slightly curved or arc shaped from the proximal end 52A to the distal end 52B. The width of each deflector finger 48, measured between the leading side 54A and the trailing side 54B tapers from the proximal end 52A to the distal end 52B. In this design, a suitable length of each deflector finger 48 between the ends 52A, 52B is between approximately 1 inch and 1.2 inches for a 3.5 inch storage disk, although the length can vary.

Each deflector finger 48 includes one or more first landing pads 56A and one or more second landing pads 56B. More specifically, the first finger 48A and the fifth finger 48E each include one first landing pad 56A that cantilevers away from the trailing side 54B near the distal end 52B and one second landing pad 56B that extends away from the trailing side 54B and the deflector body 46 near the proximal end 52A. Alternately, the second finger 48B, the third finger 48C and the fourth finger 48D each includes two, spaced apart, first landing pads 56A that cantilever away from the trailing side 54B near the distal end 52B and two, spaced apart, second landing pads 56B that extend away from the trailing side 54B and the deflector body 46 near the proximal end 52A.

The design of the landing pads 56A, 56B can vary. For example, in the embodiment illustrated in FIG. 1B, each landing pad 56A, 56B includes a wedge-shaped area and a relatively flat landing area. With this design, during shutdown, the transducer assembly (not shown in FIG. 1B) can slide up the wedge-shaped area. Alternatively, the landing pads can be configured in other suitable shapes that will accept one of the transducer assemblies.

The construction of and the materials used in the fluid deflector 18 can vary. For example, for ease of manufacturing, the deflector body 46, the deflector fingers 48 and the landing pads 56A, 56B can be made as an integral structure that is molded, cast or machined. Alternately, the deflector body 46, the deflector fingers 48 and/or the landing pads 56A, 56B can be manufactured separately and assembled together. The fluid deflector 18 can be constructed from plastics having a relatively low coefficient of friction for easy loading and unloading of the transducer assemblies 36. Alternatively, lightweight metals, ceramics, reinforced composites or other materials can be used. Moreover, the external surfaces of the fluid deflector 18 can be textured or coated to reduce drag.

Figure 1C:
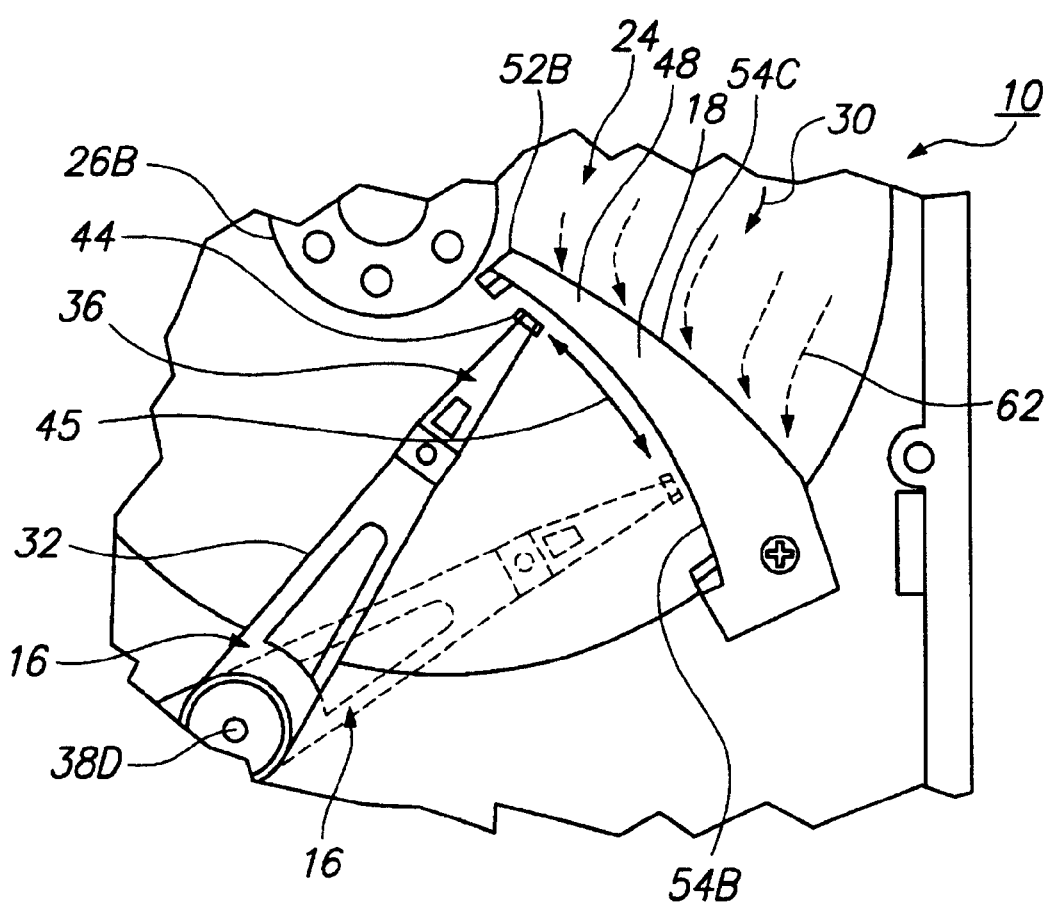
FIG. 1C is a top plan view of a portion of the disk drive of FIG. 1A with a head stack assembly in two alternate positions.

FIG. 1C illustrates a portion of the disk drive 10 including the storage disk 24, the fluid deflector 18 and the head stack assembly 16 of FIG. 1A. The head stack assembly 16 is illustrated in two alternate locations in FIG. 1C to show how the slider 44 moves along the transducer path 45 relative to the storage disk 24. The storage disk 24 is rotated in the clockwise direction 30 and the fluid deflector 18 is positioned on the upstream side of the transducer assembly 36. FIG. 1C illustrates that the leading side 54C of the deflector finger 48 curves from the distal end 52B positioned near the inner diameter 26B of the storage disk 24 towards the proximal end 52A positioned near the outer diameter 26B of the storage disk 24. With this design, the deflector finger 48 diverts and deflects fluid flow 62 (illustrated with dashed arrows) away from the transducer assembly 36 and the E-block 32 and from the inner diameter 26B towards the outer diameter 26A of the storage disk 24.

FIG. 1C also illustrates that the trailing side 54B of the deflector finger 48 is curved and has a contour that follows and parallels the transducer path 45. Stated another way, the trailing side 54B is arc shaped and has a radius that is approximately equal to the distance that the trailing side 54B is positioned away from the block axis 38B of the E-block 32. With this design, during movement of the head stack assembly 16 between the outer data track and the inner data track, the transducer assembly 36, including the slider 44, is maintained substantially equidistant from the trailing side 54B of the deflector finger 48. As a result thereof, the transducer assembly 36 is subjected to a consistent, substantially uniform environment regardless of the position of the slider 44 along the transducer path 45.

Alternately, the transducer assembly 36 can be maintained substantially equidistant from at least a portion of the trailing side 54B. Preferably, the transducer assembly 36 is maintained substantially equidistant from the trailing side 54B between at least approximately 30 percent and 100 percent of the transducer path 45 (i.e., during movement across approximately 30 percent to 100 percent of the data tracks). More preferably, the transducer assembly 36 is maintained substantially equidistant from the trailing side 54B between at least approximately 60 percent and 100 percent of the transducer path 45 (i.e., during movement across approximately 60 percent to 100 percent of the data tracks).

Additionally, FIG. 1C illustrates that the slider 44 is positioned relatively close to the deflector finger 48 regardless of the position of the slider 44 along the transducer path 45. As provided herein, the slider 44 can be maintained between approximately 0.2 millimeters and 25 millimeters away from the trailing edge 54B during movement of the slider 44 along the storage disk 24 relative to the deflector finger 48. As a result thereof, the deflector finger 48 effectively reduces the magnitude of turbulent fluid that strikes the transducer assembly 36.

Figure 2:
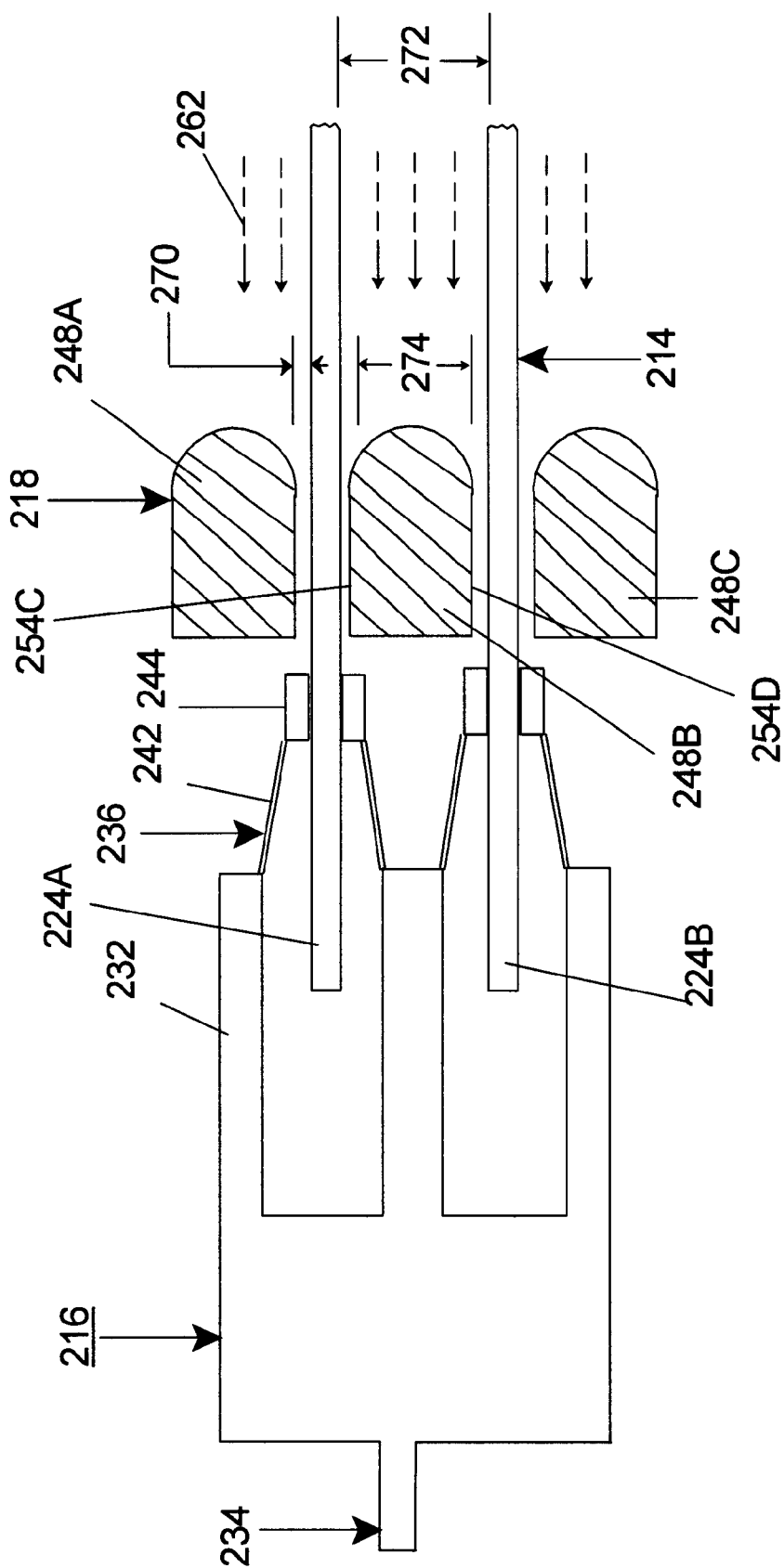
FIG. 2 is a side illustration of a portion of a head stack assembly, a portion of a disk assembly and a cross-sectional view of the fluid deflector.

FIG. 2 schematically illustrates the relationship between (i) a head stack assembly 216 including an E-block, four transducer assemblies 236, each transducer assembly 236 having a load beam 242 and a slider 244, (ii) a portion of a disk assembly 214 including a first storage disk 224A and a second storage disk 224B and (iii) a portion of a fluid deflector 218 including a first deflector finger 248A positioned above the first storage disk 224A, a second deflector finger 248B positioned between the first storage disk 224A and the second storage disk 224B, and a third deflector finger 248C positioned below the second storage disk 224B. In FIG. 2, the fluid deflector 18 is positioned upstream from the transducer assemblies 36.

A separation distance 270 between (i) the first deflector finger 248A and the first storage disk 224A, (ii) the second deflector finger 248B and storage disks 224A, 224B, and (iii) the third deflector finger 248C and the second storage disk 224B can vary. Generally, as the separation distance 270 decreases, the fluid turbulence near the respective transducer assembly 236 decreases and track misregistration decreases. Unfortunately, as separation distance 270 decreases, the drag caused by the fluid deflector 218 increases, power consumption by the spindle motor required to rotate the storage disks 224A, 224B increases, heat generated by the spindle motor increases, and the potential of a shock impulse causing the fluid deflector 218 to contact the storage disks 224A, 224B increases. Thus, the need to reduce track misregistration must be balanced with the need to efficiently rotate the storage disks 224A, 224B. As provided herein, a suitable separation distance 270 is between approximately 0.5 millimeters and 0.7 millimeters. However, greater or smaller separation distances 270 are possible. Moreover, the separation distance can vary along the deflector fingers 248A, 248B, 248C and can vary according to the shock specifications of the deflector fingers 248A, 248B, 248C and the location of any landing pads. For example, the separation distance 270 near the outer diameter can be 0.5 millimeters and the separation distance 270 near the inner diameter can be 0.7 millimeters.

Stated another way, the adjacent storage disks 224A, 224B can be spaced apart a disk distance 272 of between approximately two millimeters to four millimeters. Further, the second deflector finger 248B can have a finger thickness 274 measured between a top side 254C and a bottom side 254D (perpendicular to the storage disks) of between approximately 1.3 millimeters and 3.5 millimeters. Further, the thickness of each deflector finger 248A, 248B, 248C can taper from the proximal end to the distal end. A ratio of the finger thickness 274 to the disk distance 272 can be between approximately 0.05 and 0.95, and more specifically between approximately 0.80 and 0.95. The ratio can also vary over the length of the second deflector finger 248B.

With this spacing, the deflector fingers 248A–248C do not redirect or divert all of the fluid flow 262 away from the transducer assemblies 236. As a result thereof, the deflector fingers 248A–248C are believed to not significantly influence the flying height of the sliders 244. However, the deflector fingers 248A–248C significantly reduce the fluid turbulence that is experienced by the load beams 242 and the E-block 232. This reduces lateral flexing of the load beams 242 and the E-block 232 and the positioner 234 can accurately position and maintain the data transducer on the target track.

Figure 3:
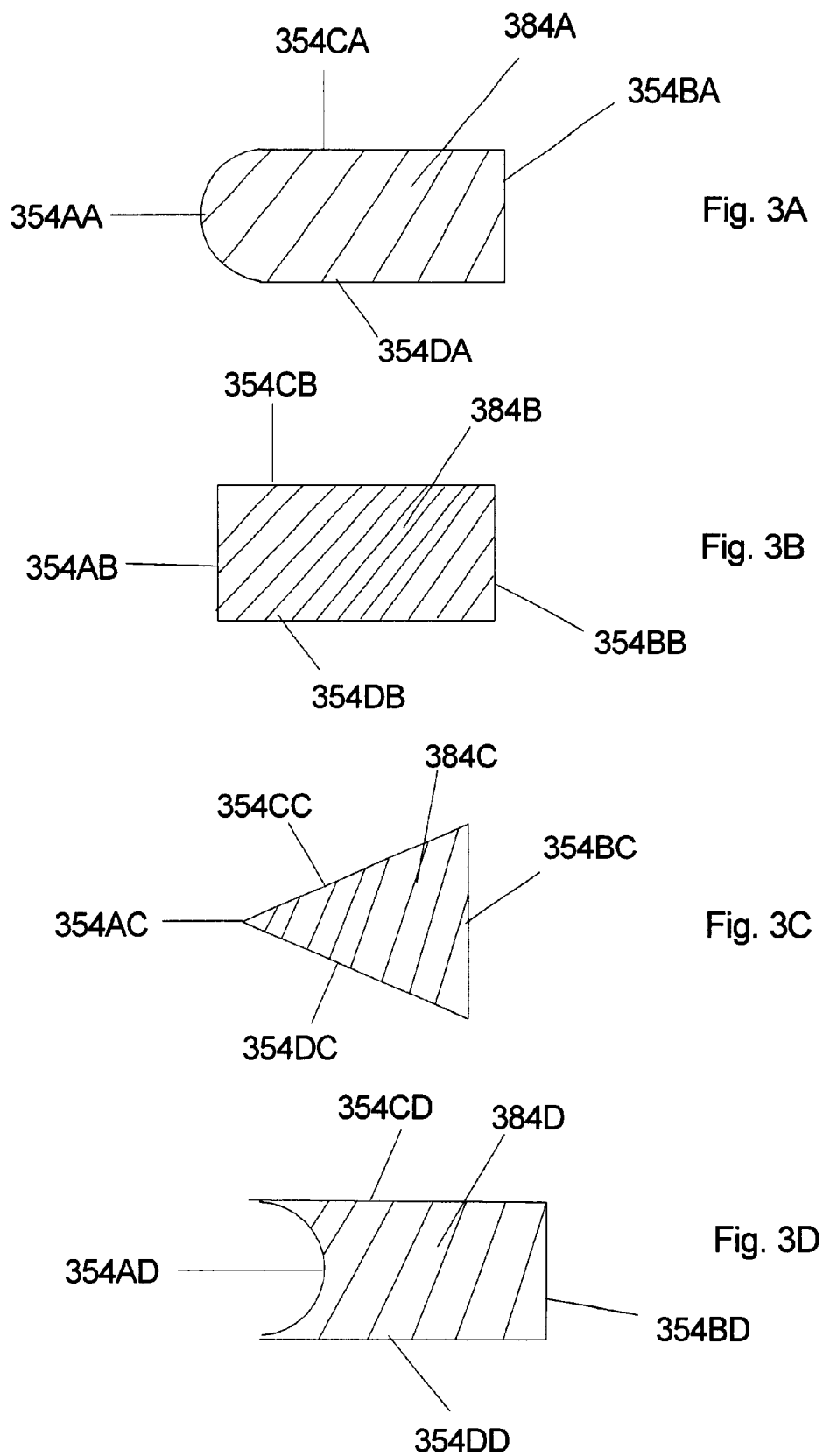
FIGS. 3A–3D illustrate alternate cross-sections of deflector fingers having features of the present invention.

FIGS. 3A–3D each illustrate alternate suitable, cross-sectional shapes of a deflector finger. More specifically, in FIG. 3A, a leading side 354AA of the deflector finger 348A is a generally curved, e.g. arch shaped, while a trailing side 354BA, a top side 354CA and a bottom side 354DA are each substantially planar shaped. In FIG. 3B, the deflector finger 348B has a rectangular shaped cross-section and the leading side 354AB, the trailing side 348BB, the top side 348CB and the bottom side 348DB are each substantially planar shaped. In FIG. 3C, the deflector finger 348C has a triangular shaped cross-section and the leading side 348AC is a line, while the trailing side 348BC, the top side 348CC and the bottom side 348DC is each substantially planar shaped. In FIG. 3D, the leading side 348AD of the deflector finger 348D is concave curve shaped, and the trailing side 348BD, the top side 348CD and the bottom side 348DD are each substantially planar shaped. However, alternate configurations of the deflector finger are possible. For example, the shape of the trailing side can be varied.

Figure 4:
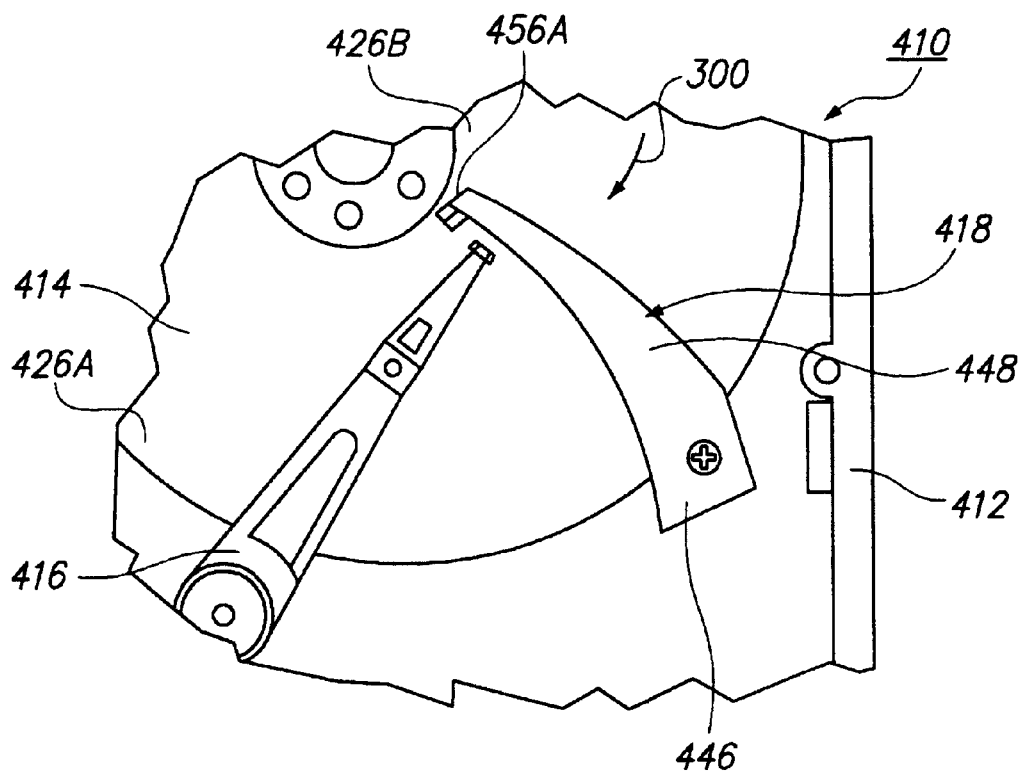
FIG. 4 is a simplified, top plan view of the disk drive including another embodiment of a fluid deflector having features of the present invention.

FIG. 4 illustrates an alternate embodiment of a disk drive 410 and a fluid deflector 418 having features of the present invention. In this embodiment, the disk drive 410 includes a drive housing 412, a disk assembly 414, and a head stack assembly 416 that are similar to the corresponding components described above and illustrated in FIG. 1A. The disk assembly 414 rotates in the clockwise direction 300. Further, the fluid deflector 418 is somewhat similar to the corresponding component described above and illustrated in FIG. 1A and includes a deflector body 446 and one or more deflector fingers 448. Each deflector finger 448 is positioned upstream from the head stack assembly 416. However, in this embodiment, each deflector finger 448 includes only one landing pad 456A that is positioned near an inner diameter 426B of the disk assembly 414. Alternately, for example, the landing pad could be positioned near an outer diameter 426A of the disk assembly 414.

FIG. 5 illustrates yet another embodiment of a disk drive 510 and a fluid deflector 518 having features of the present invention. This embodiment is similar to the embodiment illustrated in FIG. 4 and described above. However, in this embodiment, each deflector finger 548 does not include a landing pad. Alternately, for example, in this embodiment, a landing pad could be mounted elsewhere in the disk drive 510, the slider 544 could be padded or the storage disk 524 could include a landing zone.

FIG. 6 illustrates another embodiment of a disk drive 610 and a fluid deflector 618. In this embodiment, the storage disk 624 is rotated clockwise 630. Further, the deflector finger 648 is somewhat triangular shaped and diverts the fluid flow 662 generated by the storage disks 624 from the outer diameter 626C towards the inner diameter 626B of the storage disk 624. Additionally, two fasteners 650 secure the fluid deflector 618 to the drive housing 612. In this manner, the fluid deflector 618 is more stable and resistant to shock, which inhibits contact between the fluid deflector 618 and the storage disk 624.

FIG. 7 illustrates still another embodiment of the disk drive 710 and the fluid deflector 718. In this embodiment, the storage disk 724 is rotated counter clockwise 730 and the fluid deflector 718 is positioned on the upstream side of the E-block 732. The fluid deflector 718 includes a deflector finger 748 and a first landing pad 756A positioned near the inner diameter 726B of the storage disk 724.

While the particular fluid deflector and disk drive, as herein shown and disclosed in detail, is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
    a rotating first storage disk having a first surface, the rotating first storage disk generating fluid flow; and
    a first transducer assembly including a first slider positioned near the first surface of the first storage disk; and
    a fluid deflector including a first deflector finger and a first landing pad, the first deflector finger extending along the first surface of the first storage disk and deflecting fluid flow away from the first transducer assembly, the first landing pad being adapted to engage the first transducer assembly to inhibit contact between the first slider and the first storage disk.

2. The disk drive of claim 1 wherein the first storage disk includes an inner diameter and the first landing pad is positioned near the inner diameter of the storage disk.

3. The disk drive of claim 1 wherein the first storage disk includes an outer diameter and the first landing pad is positioned near the outer diameter of the first storage disk.

4. The disk drive of claim 1 wherein the fluid deflector includes a second landing pad positioned near the first surface of the first storage disk, the second landing pad being adapted to engage the first transducer assembly to inhibit contact between the first slider and the first storage disk.

5. The disk drive of claim 4 wherein the first storage disk includes an inner diameter and an outer diameter and the first landing pad is positioned near the inner diameter, and the second landing pad is positioned near the outer diameter.

6. The disk drive of claim 1 wherein the first storage disk includes an inner diameter and an outer diameter and the first deflector finger extends between approximately the inner diameter and the outer diameter.

7. The disk drive of claim 6 wherein the first deflector finger is sized and shaped for generally diverting fluid flow in a direction from the inner diameter toward the outer diameter during rotation of the first storage disk.

8. The disk drive of claim 1 wherein the storage disk includes a plurality of data tracks, and wherein the first deflector finger includes a side that remains approximately equidistant from the first slider during movement of the first slider relative to the first deflector finger across at least thirty percent of the data tracks.

9. The disk drive of claim 1 wherein the storage disk includes a plurality of data tracks and wherein the first deflector finger includes a side that remains within approximately twenty-five millimeters of the first slider during movement of the first slider relative to the first deflector finger across approximately thirty percent of the data tracks.

10. The disk drive of claim 1 wherein the first deflector finger is positioned between approximately 0.5 millimeters and 0.7 millimeters away from the first storage disk.

11. The disk drive of claim 1 including a fluid filter positioned near the fluid deflector.

12. The disk drive of claim 1 further comprising a second transducer assembly including a second slider; wherein, the first storage disk includes a second surface and the fluid deflector includes a second deflector finger that extends along the second surface and deflects the fluid flow away from the second transducer assembly.

13. The disk drive of claim 12 wherein the second deflector finger includes a first landing pad positioned near the first storage disk, the first landing pad of the second deflector finger being adapted to engage the second transducer assembly to inhibit contact between the second slider and the first storage disk.

14. The disk drive of claim 13 wherein the second fluid deflector includes a second landing pad positioned near the first storage disk, the second landing pad of the second fluid deflector being adapted to engage the second transducer assembly to inhibit contact between the second slider and the first storage disk.

15. The disk drive of claim 12 further comprising a second storage disk spaced apart from the first storage disk, wherein the second deflector finger is positioned substantially between the first storage disk and the second storage disk.

16. The disk drive of claim 15 wherein the first storage disk and the second storage disk are spaced apart a disk distance and wherein the second deflector finger has a finger thickness measured perpendicular to the storage disks that is greater than approximately 80 percent of the disk distance and less than approximately 95 percent of the disk distance.

17. The disk drive of claim 12 wherein the first storage disk includes an inner data track and an outer data track and the second deflector finger is sized and shaped for generally diverting airflow in a direction from the inner data track toward the outer data track during rotation of the first storage disk.

18. The disk drive of claim 12 wherein the second deflector finger has a side that remains approximately equidistant from the second slider during movement of the second transducer assembly relative to the second deflector finger between the data tracks.

19. The disk drive of claim 18 wherein the side of the second deflector finger remains within approximately twenty-five millimeters of the second slider during movement of the second slider across the first storage disk.

20. A disk drive comprising:
a rotating storage disk having a first surface including a plurality of data tracks, the rotating storage disk generating fluid flow;
a first transducer assembly including a first slider positioned near the first surface of the storage disk; and
a fluid deflector including a first deflector finger extending along the first surface of the storage disk, the first deflector finger being sized and shaped for generally diverting fluid flow away from the first transducer assembly during rotation of the storage disk, the first deflector finger having a side that is positioned substantially equidistant from the first slider during movement of the first slider relative to the first deflector finger across at least approximately thirty percent of the data tracks.

21. The disk drive of claim 20 wherein the storage disk includes an inner data track and an outer data track and wherein the side of the first deflector finger is positioned substantially equidistant from the first slider during movement of the first slider from approximately the inner data track to the outer data track of the storage disk.

22. The disk drive of claim 20 wherein the side of the first deflector finger remains less than approximately twenty-five millimeters from the first slider during movement of the first slider along the storage disk.

23. The disk drive of claim 20 further comprising a second transducer assembly including a second slider; wherein the storage disk further comprises a second surface and the fluid deflector further comprises a second deflector finger that extends along the second surface, the second deflector finger diverting fluid flow away from the second transducer assembly, the second finger having a side that remains substantially equidistant from the second slider during movement of the second slider across the storage disk relative to the fluid deflector.

24. The disk drive of claim 20 wherein the fluid deflector further comprises a first landing pad coupled to the first deflector finger, the first landing pad being adapted to engage the first transducer assembly to inhibit contact between the first slider and the storage disk.

25. The disk drive of claim 24 wherein the storage disk includes an inner diameter and the first landing pad is positioned near the inner diameter of the storage disk.

26. The disk drive of claim 24 wherein the storage disk includes an outer diameter and the first landing pad is positioned near the outer diameter of the storage disk.

27. The disk drive of claim 24 wherein the fluid deflector includes a second landing pad positioned near the first surface of the storage disk, the second landing pad being adapted to engage the first transducer assembly to inhibit contact between the first slider and the storage disk.

28. The disk drive of claim 27 wherein the storage disk includes an inner diameter and an outer diameter, the first landing pad is positioned near the inner diameter, and the second landing pad is positioned near the outer diameter.

29. The disk drive of claim 20 wherein the storage disk includes an inner diameter and an outer diameter and the first deflector finger extends between approximately the inner diameter and the outer diameter.

30. The disk drive of claim 20 wherein the storage disk includes an inner diameter and an outer diameter and the first deflector finger is sized and shaped for generally diverting fluid flow in a direction from the inner diameter toward the outer diameter.

31. The disk drive of claim 20 wherein the first deflector finger is positioned between approximately 0.5 millimeters and 0.7 millimeters away from the storage disk.

32. The disk drive of claim 20 further comprising a fluid filter positioned near the fluid deflector.

33. A disk drive comprising:
a rotating storage disk having a first surface including a plurality of data tracks, the rotating storage disk generating fluid flow;
a first transducer assembly including a first slider positioned near the first surface of the storage disk; and
a fluid deflector including a first deflector finger extending along the first surface of the storage disk, the first deflector finger being sized and shaped for generally diverting fluid flow away from the first transducer assembly, the first deflector finger having a side that remains within approximately twenty-five millimeters of the first slider during movement of the slider relative to the first deflector finger across at least approximately thirty percent of the data tracks.

34. The disk drive of claim 33 wherein the storage disk includes an inner data track and an outer data track and the side is positioned substantially equidistant from the first slider during movement of the first slider from approximately the inner data track to the outer data track.

35. The disk drive of claim 33 further comprising a second transducer assembly including a second slider; wherein the storage disk further comprises a second surface and the fluid deflector further comprises a second deflector finger that extends along the second surface, the second deflector finger diverting fluid flow away from the second transducer assembly, the second deflector finger having a side that remains substantially equidistant from the second slider during movement of the second slider along the storage disk relative to the second deflector finger.

36. The disk drive of claim 33 wherein the fluid deflector further comprises a first landing pad coupled to the first deflector finger, the first landing pad being adapted to engage the first transducer assembly to inhibit contact between the first slider and the storage disk.

37. The disk drive of claim 36 wherein the storage disk includes an inner diameter and the first landing pad is positioned near the inner diameter of the storage disk.

38. The disk drive of claim 36 wherein the storage disk includes an outer diameter and the first landing pad is positioned near the outer diameter of the storage disk.

39. The disk drive of claim 36 wherein the fluid deflector includes a second landing pad positioned near the first surface of the storage disk, the second landing pad being adapted to engage the first transducer assembly to inhibit contact between the first slider and the storage disk.

40. The disk drive of claim 39 wherein the storage disk includes an inner diameter and an outer diameter, the first landing pad is positioned near the inner diameter, and the second landing pad is positioned near the outer diameter.

41. The disk drive of claim 33 wherein the storage disk includes an inner diameter and an outer diameter and the first deflector finger extends between approximately the inner diameter and the outer diameter.

42. The disk drive of claim 33 wherein the first deflector finger is positioned between approximately 0.5 millimeters and 0.7 millimeter away from the storage disk.

43. The disk drive of claim 33 including a fluid filter positioned near the fluid deflector.

44. A disk drive comprising:
a rotating storage disk having a first surface, an inner data track and an outer data track, the rotating storage disk generating fluid flow;
a first transducer assembly including a first slider positioned near the first surface of the storage disk; and
a fluid deflector including a first deflector finger and a first landing pad, the first finger extending along the first surface of the storage disk from the outer data track towards the inner data track and deflecting fluid flow away from the first transducer assembly, the first deflector finger being upstream from the first slider, the first deflector finger having a side that is positioned substantially equidistant from the first slider during movement of the first slider between the inner data track and the outer data track along the storage disk relative to the first deflector finger, the first landing pad being adapted to engage the first transducer assembly to inhibit contact between the first slider and the storage disk.

45. The disk drive of claim 44 wherein the fluid deflector includes a second landing pad positioned near the first surface of the storage disk, the second landing pad being adapted to engage the first transducer assembly to inhibit contact between the first slider and the storage disk.

46. The disk drive of claim 45 wherein the first landing pad is positioned near the inner data track, and the second landing pad is positioned near the outer data track.

47. The disk drive of claim 44 wherein the side of the first deflector finger remains within approximately twenty-five millimeters of the first slider during movement of the first slider along the storage disk between the inner data track and the outer data track.

48. The disk drive of claim 44 wherein the first deflector finger is positioned between approximately 0.5 millimeters and 0.7 millimeters away from the storage disk.

49. The disk drive of claim 44 including a fluid filter positioned near the fluid deflector.

50. A method for enhancing the reliability of a disk drive, the disk drive having a rotating storage disk and a transducer assembly including a slider positioned near the storage disk, the method comprising the step of: diverting flow away from the transducer assembly with a fluid deflector having deflector finger that extends along the storage disk, the fluid deflector including a landing pad that is adapted to engage the transducer assembly to inhibit contact between the slider and the storage disk.

51. The method of claim 50 further comprising the step of positioning the landing pad near an inner diameter of the storage disk.

52. The method of claim 50 further comprising the step of positioning the landing pad near an outer diameter of the storage disk.

53. The method of claim 50 wherein the step of diverting flow includes the step of positioning the deflector finger to extend between approximately an inner diameter and an outer diameter of the storage disk.

54. The method of claim 53 wherein the step of diverting flow includes diverting the fluid flow generally from the inner diameter towards the outer diameter.

55. The method of claim 50 wherein step of diverting flow includes the step of positioning the deflector finger so that a side of the deflector finger remains approximately equidistant from the slider during movement of the slider across the storage disk relative to the deflector finger.

56. The method of claim 50 wherein step of diverting flow includes the step of positioning the deflector finger so that a side of the deflector finger remains within approximately twenty-five millimeters from the slider during movement of the slider across the storage disk relative to the deflector finger.

57. The method of claim 50 wherein the step of diverting flow includes the step of positioning the first deflector finger between approximately 0.5 millimeters and 0.7 millimeters away from the storage disk.

58. A method for enhancing the reliability of a disk drive, the disk drive having a rotating storage disk and a transducer assembly including a slider positioned near the storage disk, the method comprising the step of: diverting flow away from the transducer assembly with a deflector finger that extends along the storage disk, the deflector finger having a side that is positioned substantially equidistant from the slider during movement of the slider across the storage disk relative to the deflector finger.

59. The method of claim 58 further comprising the step of coupling a landing pad to the deflector finger, the first landing pad being adapted to engage the transducer assembly to inhibit contact between the slider and the storage disk.

60. The method of claim 58 wherein the step of diverting flow includes the step of positioning the deflector finger so that the deflector finger extends between approximately an inner diameter and an outer diameter of the storage disk.

61. The method of claim 60 wherein the step of diverting flow includes diverting the flow generally from the inner diameter towards the outer diameter.

62. The method of claim 58 wherein step of diverting flow includes the step of positioning the deflector finger so that the side remains within approximately twenty-five millimeters from the slider during movement of the first slider across the storage disk.

63. A disk drive comprising:
a rotating storage disk having a first surface including a plurality of data tracks, the rotating storage disk generating fluid flow generally in a direction moving from upstream to downstream;
an E-block;
a first transducer assembly that is coupled to the E-block, the first transducer assembly including a first slider positioned near the first surface of the storage disk, the first slider being positioned substantially upstream from the E-block; and
a fluid deflector including a first deflector finger extending along the first surface of the storage disk, the first deflector finger being sized and shaped for generally diverting fluid flow away from the first transducer assembly during rotation of the storage disk.

64. The disk drive of claim 63 wherein the first deflector finger includes a side that is positioned substantially equidistant from the first slider during movement of the first slider relative to the first deflector finger across at least approximately thirty percent of the data tracks.

65. The disk drive of claim 64 wherein the storage disk includes an inner data track and an outer data track and wherein the side of the first deflector finger is positioned substantially equidistant from the first slider during movement of the first slider from approximately the inner data track to the outer data track of the storage disk.

66. The disk drive of claim 64 wherein the side of the first deflector finger remains less than approximately twenty-five millimeters from the first slider during movement of the first slider along the storage disk.

67. The disk drive of claim 63 further comprising a second transducer assembly including a second slider; wherein the storage disk further comprises a second surface and the fluid deflector further comprises a second deflector finger that extends along the second surface, the second deflector finger diverting fluid flow away from the second transducer assembly, the second finger having a side that remains substantially equidistant from the second slider during movement of the second slider across the storage disk relative to the fluid deflector.

68. The disk drive of claim 63 wherein the fluid deflector further comprises a first landing pad coupled to the first deflector finger, the first landing pad being adapted to engage the first transducer assembly to inhibit contact between the first slider and the storage disk.

69. The disk drive of claim 68 wherein the storage disk includes an inner diameter and the first landing pad is positioned near the inner diameter of the storage disk.

70. The disk drive of claim 68 wherein the storage disk includes an outer diameter and the first landing pad is positioned near the outer diameter of the storage disk.

71. The disk drive of claim 68 wherein the fluid deflector includes a second landing pad positioned near the first surface of the storage disk, the second landing pad being adapted to engage the first transducer assembly to inhibit contact between the first slider and the storage disk.

72. The disk drive of claim 71 wherein the storage disk includes an inner diameter and an outer diameter, the first landing pad is positioned near the inner diameter, and the second landing pad is positioned near the outer diameter.

73. The disk drive of claim 63 wherein the storage disk includes an inner diameter and an outer diameter and the first deflector finger extends between approximately the inner diameter and the outer diameter.

74. The disk drive of claim 63 wherein the storage disk includes an inner diameter and an outer diameter and the first deflector finger is sized and shaped for generally diverting fluid flow in a direction from the inner diameter toward the outer diameter.

75. The disk drive of claim 63 wherein the E-block includes a first actuator arm and a spaced apart second actuator arm that is adjacent to the first actuator arm, wherein the no portion of the fluid deflector is positioned directly between the first actuator arm and the second actuator arm.

* * * * *

UNITED STATES PATENT AND TRADEMARK OFFICE
CERTIFICATE OF CORRECTION

PATENT NO. : 6,600,625 B1
DATED : July 29, 2003
INVENTOR(S) : Munninghoff et al.

It is certified that error appears in the above-identified patent and that said Letters Patent is hereby corrected as shown below:

<u>Title page,</u>
Item [56], References Cited, U.S. PATENT DOCUMENTS, please add
-- 6,097,568    8/2000        Ekhoff
   5,231,549    7/1993        Morehouse et al. --

Signed and Sealed this

Twenty-third Day of December, 2003

JAMES E. ROGAN
*Director of the United States Patent and Trademark Office*